United States Patent [19]

Daimon et al.

[11] Patent Number: 5,461,825
[45] Date of Patent: Oct. 31, 1995

[54] POT FOR CULTURING PLANTS

[75] Inventors: Junko Daimon; Yasuo Takeda, both of Tochigi; Katsunori Kodama, Tokyo, all of Japan

[73] Assignees: Japan Tobacco Inc.; JT AGRIS Corp., both of Tokyo, Japan

[21] Appl. No.: 156,715

[22] Filed: Nov. 24, 1993

[30] Foreign Application Priority Data

Feb. 1, 1993 [JP] Japan .................. 5-006422 U

[51] Int. Cl.$^6$ .................................................. A01G 9/04
[52] U.S. Cl. ........................ 47/71; 47/73; 47/84
[58] Field of Search ............... 47/75 N, 63, 62 R, 47/79, 71, 73, 84 C

[56] References Cited

U.S. PATENT DOCUMENTS

| Re. 21,820 | 6/1941 | Munsell | 47/63 |
|---|---|---|---|
| 151,142 | 5/1874 | Lynch | 47/75 N |
| 586,485 | 7/1897 | Gayn | 47/75 N |
| 1,168,122 | 1/1916 | Smith | 47/75 N |
| 3,961,443 | 6/1976 | Insalace | 47/84 C |
| 4,265,050 | 5/1981 | Buescher | 47/71 |
| 4,481,733 | 11/1984 | Jacobs | 47/71 |
| 4,976,064 | 12/1990 | Julien | 47/63 |
| 5,044,120 | 9/1991 | Couch | 47/79 |
| 5,103,588 | 4/1992 | Reiger | 47/73 R |

FOREIGN PATENT DOCUMENTS

| 66991 | 5/1991 | Australia | 47/79 |
|---|---|---|---|
| 2544958 | 11/1984 | France | 47/75 N |
| 356072 | 7/1922 | Germany | 47/79 |
| 2815738 | 10/1979 | Germany | 47/75 N |
| 4200328 | 7/1992 | Japan | 47/62 |

Primary Examiner—Henry E. Raduazo

[57] ABSTRACT

A pot for culturing a plant, particularly bulbous plants from which sprouts elongate while stem roots stretch out such as Liliaceae wherein the plant can grow upright in good condition, has a good appearance, and moreover, the grown plant may not fall down and assure a satisfactory number of flowers.

In other words, a pot for culturing plants has a lid having a stem opening at the center, a guide tube having openings for the passage of stem roots and a pot having a side wall and a bottom portion, wherein the lid is attached onto the upper edge of the pot with the pot combined with the guide tube.

15 Claims, 2 Drawing Sheets

POT FOR CULTURING PLANTS

FIELD OF THE INVENTION

This invention relates to a pot for culturing a plant, particularly to a pot for culturing bulbous plants in which sprouts elongate while stem roots stretch out such as Liliaceae.

BACKGROUND OF THE INVENTION

In the prior art, to culture bulbous plants in which sprouts elongate while stem roots stretch out such as Liliaceae, one uses a conventional pot used for culturing any kind of plants.

Such a conventional pot comprises a round bottom, a side wall portion provided to surround the bottom, forming an opening on the top.

When one uses a conventional pot which is not deep enough for culturing a bulbous plant which should be embedded deeply and in which sprouts elongate while stem roots stretch out such as Liliaceae, these sprouts have difficulty to sprout and grow upright.

Plants not grown upright but grown curved are of a poor appearance and, moreover, tend to fall down.

On the other hand, when bulbous plants in which stem roots stretch out such as Liliaceae are cultured using a pot for cultivating a plant comprising a lid having a stem opening at the center, a guide tube and a pot having a side wall and a bottom portion, wherein the lid is formed to be placed on the upper edge of the pot when the guide tube is placed in the pot, sprouts can surely grow upright along the guide tube but tend to grow poorly and cause the blind because stem roots grow thick in the guide tube and, thus, can not take enough nourishment and water.

DISCLOSURE OF THE INVENTION

The object of the invention is to provide a pot for culturing a plant, particularly bulbous plants from which sprouts elongate while stem roots stretch out such as Liliaceae wherein the plant can grow healthy and upright, may have a good appearance, and moreover, the grown plant may not fall down and assure a satisfactory number of flowers.

Means for attaining the above object will be discussed below.

First, this invention provides a pot for culturing a plant comprising a guide tube having openings for the passage of stem roots and a pot having a side wall and a bottom portion.

Second, this invention provides a pot for culturing a plant comprising a lid having a stem opening at the center, a guide tube having openings for the passage of stem roots and a pot having a side wall and a bottom portion, wherein the lid is formed to be attached onto the upper edge of the pot with the pot combined with the guide tube.

Third, this invention provides a pot for culturing a plant mentioned hereabove wherein the diameter of the guide tube is smaller than that of the stem opening of the lid.

Here, the guide tube can be embodied to take square, hexagonal or other polygonal forms in place of a cylindrical form.

The size of openings for the stem roots passage of the guide tube can be determined so as to prevent sprouts put forth from a bulb from passing.

The opening can be configured, on the guide tube not to prevent stem roots stretching in every direction from passing by, for instance, forming a mesh by making the guide tube a network or by perforating small holes through the guide tube.

On the other hand, the length of the guide tube can be determined so as to allow the upper portion of the guide tube to protrude from the stem opening of the lid when the guide tube is combined with the pot if the diameter of the guide tube is smaller than that of the stem opening of the lid.

When the pot of the invention is used, a bulb is placed at the center of culture soil filled in the pot, culture soil is filled so as to expose the top of the bulb slightly, then the guide tube is placed perpendicularly putting the top of the bulb at the center and, finally, culture soil is filled inside and outside the guide tube to prevent it from falling down.

Here, if the pot for culturing plant comprises a lid, the pot is used with the lid placed on the upper edge of the pot after the step for preventing the guide tube from falling down.

Sprouts put forth from the bulb grow upward, substantially in the perpendicular direction, all the way supported by the guide tube.

At the same time, stem roots stretch out in every direction passing through openings of the guide tube and taking enough nourishment and water from culture soil inside and outside the guide tube.

Since the pot of the invention comprises a guide tube that permits sprouts put forth from a bulb to grow upright all the way supported by the guide tube and stem roots to stretch out in every direction passing through openings of the guide tube and taking enough nourishment and water from culture soil inside and outside the guide tube, it is suitable for culturing bulbous plants in which sprouts elongate while stem roots stretch out such as Liliaceae. By using the pot of the invention, plants can grow upright in good condition, have an excellent appearance and proportionally grown hardly fall down and are able to have good flowers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS

Figure 1:
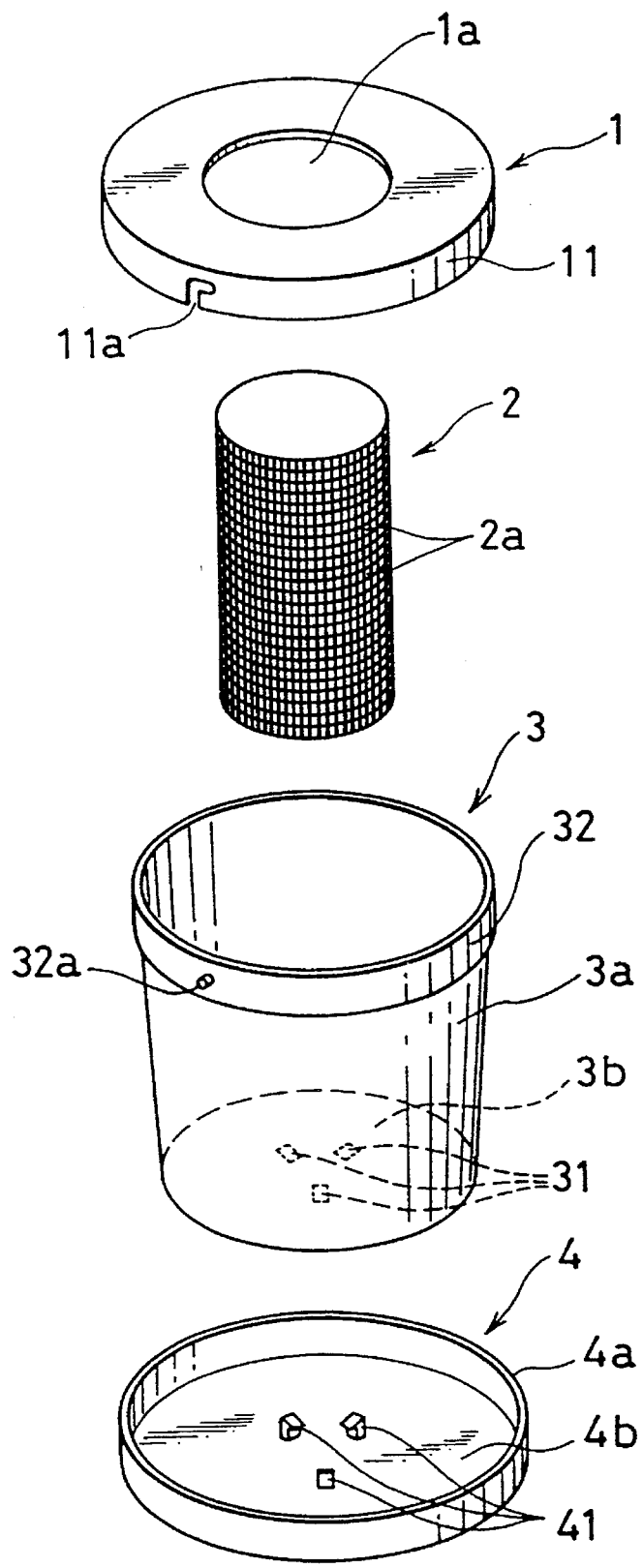
FIG. 1 shows a developed perspective view of a preferred embodiment of a pot for culturing plants of this invention.

A preferred embodiment of a pot for culturing plants according to this invention will be discussed in detail by making reference to the drawings.

The pot for culturing plants of the preferred embodiment comprises a lid (1) in which a stem opening (1a) is provided at the center, a cylindrical guide tube (2) made of plastic material in which openings (2a) of mesh structure are formed by making the whole as a network, a pot (3) having a side wall portion (3a) and a bottom portion (3b) provided with openings (31) and a water receiving plate (4) having a rim wall portion (4a) and a bottom portion (4b).

As for the representative dimensions of the cylindrical guide tube (2), the height is approximately 8 cm, the diameter is approximately 5 cm while the size of mesh structure openings (2a) is approximately 0.5 cm Here, the length of the cylindrical guide tube (2) is selected appropriately according to the bulb to be embedded so as to allow the top of the cylindrical guide tube (2) to protrude slightly from the stem opening (1a) when the lid (1) is attached.

The diameter of the stem opening (1a) of the lid (1) is slightly bigger than that of the guide tube (2) and an engagement wall (11) is provided to surround the edge of the lid (1). On the engaging wall (11), an L-shape groove (11a) is provided.

Another engaging wall (32) extends from the upper edge of the pot (3). The engaging wall (32) is provided with a stick projection (32a) that is engageable with the groove (11a) of the lid (1).

On the other hand, inside the bottom portion (4b) of the water receiving plate (4), engaging hooks (41) are provided to engage in the opening (31) on the bottom portion (3b) of the pot (3).

The engaging hooks (41) and the openings (31) are so formed that water can be supplied into the pot (3) through the openings (31) even when the engaging hooks and the openings are engaged. According to another preferred embodiment (not shown in the drawings), additional openings for supplying water may be provided on the bottom portion (3b) of the pot (3).

Now, the method of using the pot for culturing plants discussed above will be explained below.

First, a lily bulb (variety name: Novo Cento : Asiatic hybrid) whose circumference is approximately 17 cm is placed at the center of a pot (3) filled with culture soil (trade name: Metromix) approximately 3 cm from the bottom, then culture soil is refilled so as to expose the bulb top slightly.

Then the cylindrical guide tube (2) is placed perpendicularly positioning the bulb top at the center and culture soil is filled inside and outside the cylindrical guide tube (2) compacting it gently. Then a lid (1) is placed over the pot (2) so as to allow the upper portion of the cylindrical guide tube (2) to protrude slightly from the stem opening (1a).

At this time, the groove (11a) of the lid (1) is fitted with a stick projection (32a) of the pot (3).

Moreover, the pot (3) is fixed securely to the water receiving plate (4) by engaging the openings (31) with engaging hooks (41).

When water is stored in the water receiving plate (4), the water is supplied to the soil in the pot (3) via the openings (31) on the bottom portion (3b) of the pot (3). However, water may be supplied through the stem opening (1a) on the lid (1).

Sprouts put forth from the bulb grow upward all the way supported by the cylindrical guide tube (2) then elongate upward from the stem opening (1a) of the lid (1) and grow substantially in the perpendicular direction.

Figure 2:
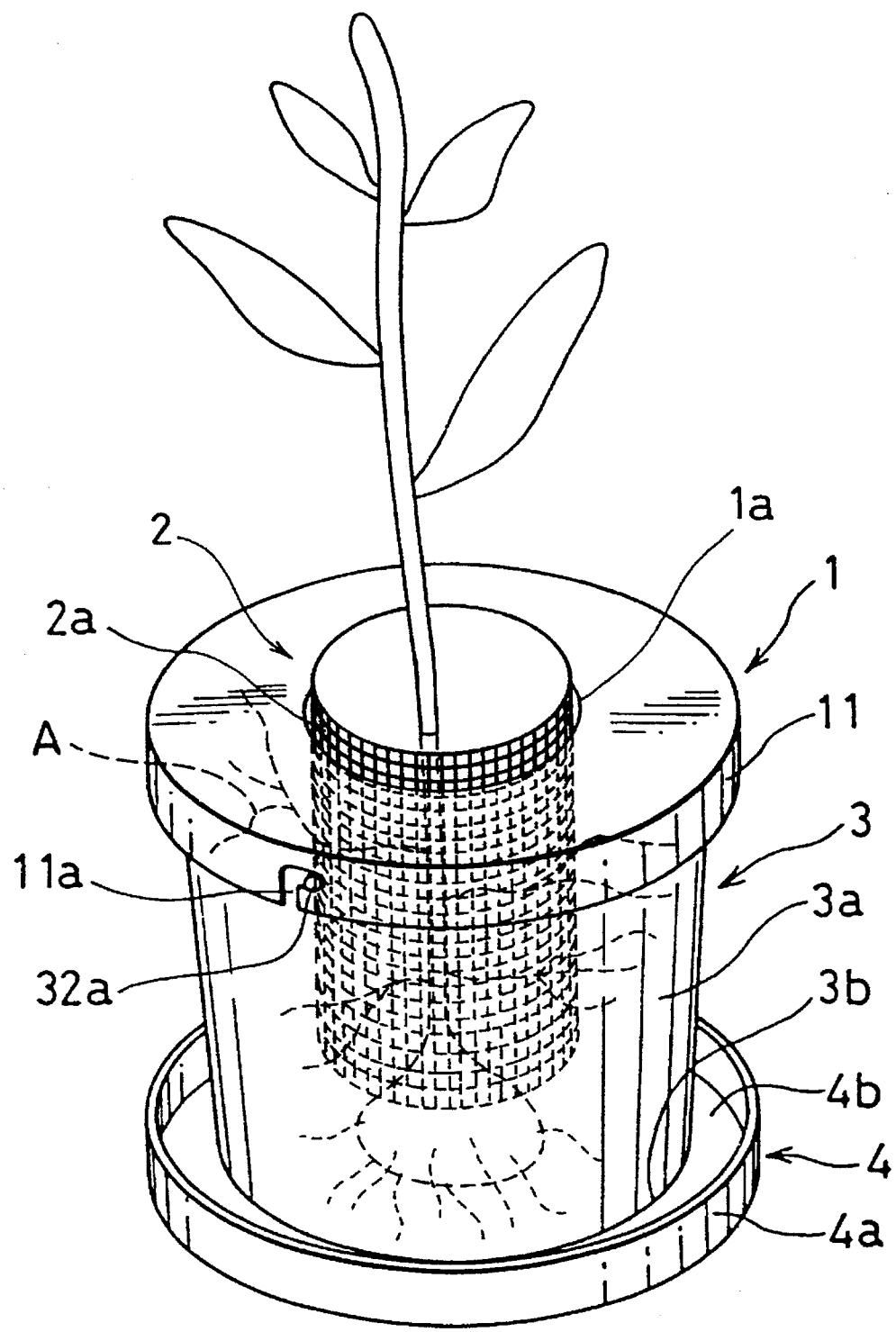
FIG. 2 shows a perspective view describing how a preferred embodiment of a pot for culturing plants of this invention is used.

Meanwhile, as shown in the FIG. 2, stem roots A stretch out in different directions through openings (2a) of the cylindrical guide tube (2) and take enough nourishment and water from culture soil inside and outside the cylindrical guide tube (2).

Please note that the pot of this invention may be properly used not only culturing bulbous plants of Liliacea, but also for any kinds of plants in general.

Now, examples of culture of bulbous plants of Liliacea using the pot for culturing plants of the present invention (Invention group) and examples of culture of bulbous plants of Liliacea without using the pot for culturing plant of the present invention (Control group) are discussed below.

As the Invention group, 10 (ten) sets of pot for culturing plants as discussed in the preferred embodiment are provided and 1 (one) lily bulb per set is embedded aslant intentionally preventing the bulb center from being directed upright, then the growth of the lily is observed.

On the other hand, as the Control group I, lilies are cultured exactly as in the Invention group except that the cylindrical guide tube is not used, and their growth is observed.

Moreover, as the Control group II, lilies are cultured exactly as in the Invention group except that the cylindrical guide tube is simple tubular member provided with no opening for the passage of stem roots, and their growth is observed.

The results are as described below.

In the Invention group, sprouts of all the 10 sets grow normally guided by the cylindrical guide tube to the stem opening of the lid, elongate upward from the stem opening of the lid, grow substantially in the perpendicular direction and 3 to 5 flowers are obtained respectively for all the 10 sets.

Stem roots stretch out in different directions through openings of the cylindrical guide tube, extend strongly and regularly so as to, as the result, take enough nourishment and water from culture soil inside and outside the guide tube.

As for the Control group I, sprouts put forth strike against the periphery of the lid, meander in the pot and can not grow upright from the stem opening in 80% of sets.

In the Control group II, sprouts of all the 10 sets grow toward the stem opening of the lid guided by the cylindrical guide tube, elongate upward from the stem opening of the lid, grow substantially in the perpendicular direction, but stem roots grow thick in the cylindrical guide tube and can not absorb nourishment.

As the result, flowering is observed on only 5 sets among 10 and moreover, the number of flowers is limited to one or two and the blind is noticed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pot for culturing plants comprising a lid having a stem opening at the center, a guide tube having openings for the passage of stem roots, a pot having a side wall and a bottom portion, and a plate, a plurality of openings being provided in the bottom portion of the pot, the plurality of openings remaining open during use of the pot such that liquid can freely enter and exit the pot through the openings, the lid being attachable to an upper edge of the pot and the plate having a plurality of engaging hooks, each of the openings in the bottom portion of the pot receiving one of the hooks to thereby hold the pot to the plate, a space being provided between the hooks and edges of the openings whereby liquid can freely pass through the openings into and out of the pot.

2. The pot for culturing plants of claim 1, wherein the diameter of the guide tube is smaller than that of the stem opening of the lid.

3. The pot for culturing plants of claim 1, wherein the guide tube is a network.

4. The pot for culturing plants of claim 2, wherein the guide tube is a network.

5. The pot for culturing plants of claim 3, wherein the guide tube is formed by perforating small holes.

6. The pot for culturing plants of claim 4, wherein the guide tube is formed by perforating small holes.

7. The pot for culturing plants of claim 5, wherein the form of the guide tube is cylindrical.

8. The pot for culturing plants of claim 1, wherein holes are uniformly spaced along the length and diameter of the guide tube, the holes being located adjacent both ends of the guide tube.

9. The pot for culturing plants of claim 1, wherein holes are uniformly spaced along the guide tube between both ends thereof.

10. The pot for culturing plants of claim 1, wherein the guide tube is a mesh structure, a majority of which is covered by soil during culturing of plants.

11. The pot for culturing plants of claim 1, wherein the guide tube is plastic.

12. The pot for culturing plants of claim 1, wherein the guide tube has a constant, unchanging size from top to bottom.

13. The pot for culturing plants of claim 12, wherein the guide tube has a uniform diameter which is less than a diameter of the stem opening.

14. The pot for culturing plants of claim 1, wherein the lid has a flat, top portion having the stem opening and a smooth engagement wall around a periphery thereof, the engagement wall surrounds the upper edge of the pot when the lid is on the pot and the lid is then in generally unbroken engagement with the upper edge of the pot.

15. A pot for culturing plants comprising a lid having a stem opening at the center, a guide tube having openings for the passage of stem roots, a pot having a side wall and a bottom portion, and a plate, a plurality of openings being provided in the bottom portion of the pot, the plurality of openings remaining open during use of the pot such that liquid can freely enter and exit the pot through the openings, the lid being attachable to an upper edge of the pot and the guide tube extending through the stem opening of the lid, the plate having a plurality of engaging hooks, each of the openings in the bottom portion of the pot receiving one of the hooks to thereby hold the pot to the plate, a space being provided between the hooks and edges of the openings whereby liquid can freely pass through the openings into and out of the pot.

* * * * *